United States Patent
Tsimelzon et al.

(10) Patent No.: US 7,383,253 B1
(45) Date of Patent: Jun. 3, 2008

(54) PUBLISH AND SUBSCRIBE CAPABLE CONTINUOUS QUERY PROCESSOR FOR REAL-TIME DATA STREAMS

(75) Inventors: Mark Tsimelzon, Sunnyvale, CA (US); Aleksey Sanin, Sunnyvale, CA (US); Rajeev Motwani, Palo Alto, CA (US); Glenn Robert Seidman, Woodside, CA (US); Gayatri Patel, Monte Sereno, CA (US)

(73) Assignee: Coral 8, Inc., Mountain View, CA (US)

( * ) Notice: Subject to any disclaimer, the term of this patent is extended or adjusted under 35 U.S.C. 154(b) by 434 days.

(21) Appl. No.: 11/015,963

(22) Filed: Dec. 17, 2004

(51) Int. Cl.
*G06F 17/30* (2006.01)
(52) U.S. Cl. ......................................................... 707/3
(58) Field of Classification Search .............. 707/1–10, 707/100–104.1, 200–206; 705/14
See application file for complete search history.

(56) References Cited

U.S. PATENT DOCUMENTS

| | | | |
|---|---|---|---|
| 2002/0095399 A1* | 7/2002 | Devine et al. | 707/1 |
| 2003/0212699 A1* | 11/2003 | Denesuk et al. | 707/102 |
| 2005/0267871 A1* | 12/2005 | Marchisio et al. | 707/3 |
| 2006/0129458 A1* | 6/2006 | Maggio | 705/14 |

OTHER PUBLICATIONS

Srikrishnan Sundaresan et al., "Schema Integration of Distributed Databases Uings Hyper-Graph Data Model", 2005, IEEE, pp. 548-553.*

Hector A. Duran-Limon et al., "Resource Management for the Real-Time Support of an Embedded Publish/Subscribe System", (no date), www.comp.lancs.ac.uk/research/mpg/projects, pp. 1-13.*
Abadi, Daniel J. (2003) Aurora: a new model and architecture for data stream management. The VLDB Journal; Published online 2003—Springer-Verlag. Digital Ojbect Identifier (DOI) 10.1007/s00778-003-0095-z. pp. 1-20.
Arasu, A.; Babcock, B.; Babu, S.; Cieslewicz, J.; Datar, M.; Ito, K.; Motwani, R,; Srivastava, U.; Widom, J.. STREAM: The Stanford Data Stream Management System, Book chapter, Mar. 15, 2004, Book to be edited by Garofalakis, Gehrke, and Rastogi, pp. 1-21.
CELEQUEST, Celequest: Products: Streaming DataFlow Engine, pp. 1-2, http//www.celequest.com/products/tec_sreamingdfe.asp, visited Jul. 24, 2004.
Sailesh Krishnamurthy, et al. TelegraphCQ: An Architectural Status Report, IEEE Data Engineering Bulletin, Mar. 2003, pp. 1-8.

* cited by examiner

*Primary Examiner*—Diane Mizrahi

(57) ABSTRACT

A Continuous Query Processor processes queries on continuously updating data sources or data streams and includes a Publication Manager for accepting published structured elements of data from data stream Publishers, a Subscription Manager for giving structured elements of data to one or more data stream Subscribers, a Query Module Manager for processing queries represented by Query Modules, a Query Module Store for maintaining deployed Query Modules, a Query Primitive Manager performing processing for various primitives that comprise a Query Module, and a Schedule Manager for coordinating when a primitive within a Query Module gets processed in order to maintain that each continuous query is continuously updated immediately upon the arrival of structured element data affecting any part of a continuous query.

30 Claims, 9 Drawing Sheets

PUBLISH AND SUBSCRIBE CAPABLE CONTINUOUS QUERY PROCESSOR FOR REAL-TIME DATA STREAMS

BACKGROUND OF THE INVENTION

1. Field of the Invention

The present invention pertains to query processors that receive data continuously from one or more publishers of data streams in order to push query results as data streams to one or more subscribers continuously.

2. Description of the Related Art

There are many real-time information systems today that receive data continuously from multiple information sources. Examples include financial systems tracking traded instrument transactions, geographically distributed weather information systems, industrial systems collecting information from distributed devices, public train systems, credit card systems, real-time military information systems, as well as many others. Each of these systems not only receives data continuously from multiple sources, but also processes the data in order to detect specific conditions and/or merge, sort, transform, and derive meaningful results.

One aspect of continuous processing on multiple heterogeneous data streams that has received minimal attention and standardization in the real-time information industry is a general-purpose and organized approach for processing multiple continuous data streams. In the last few years, the Stanford STREAM project has researched and published many papers describing a Continuous Query Language (CQL) that can be used for general purpose query language processing on data streams. Berkeley's TelegraphCQ project also has researched and published papers describing a Continuous Query system which employs modifications on the OpenSource PostgreSQL Database, which is conventionally known. As such, TelegraphCQ utilizes tables in PostgreSQL to perform the continuous queries. We would expect reduced performance from this approach since PostgreSQL's tables are not meant for continuous processing and because tables naturally reside on disk. Brown University's Aurora data stream Management System project processes query results immediately as each new data stream element arrives, but it does not use SQL-like queries to process information and lacks publish and subscribe sources of data stream information. The Aurora implementation also does not provide support for different incoming and outgoing formats and representations. Celequest's Streaming DataFlow Engine is based on Stanford's STREAM research. Stanford's STREAM data stream Management System, however, employs an implementation that does not process data streams directly. It also lacks the ability to accept and generate data streams of information employing different formats and representations.

Data stream data in STREAM is processed via a description in CQL using three types of operators. They are Stream-to-Relation, Relation-to-Relation, and Relation-to-Stream. All three operators must be employed in a CQL expression in order to produce a resulting output stream. CQL uses SQL constructs to express Relation-to-Relation operators, and most of the data manipulation in CQL is executed via a description of the use of these constructs. Stream-to-Relation operators in CQL are primarily based on sliding windows. This allows CQL to consider recent data (as per a sliding window based on time or amount of data) from a data stream to be in a "Relation", after which the Relation-to-Relation operators may perform. One way of thinking about the operational mechanics of this processing is to consider all of the data in the sliding window to be in a virtual table representing the Relation. Finally, an output stream may be produced via a Relation-to-Stream operator which may be one of IStream, DStream, or RStream representing "insert stream", "delete stream", and "relation stream" respectively. One way of thinking about how these operators work is to think of the virtual table created by the Stream-to-Relation operator. The IStream represents the data produced when considering the data that gets inserted into the virtual table. The DStream represents the data produced when considering the data that gets removed from the virtual table due to the limited sliding window size, while RStream represents the data in the virtual table. Note that this implies that an RStream is a Stream where each datum is a Relation where each Relation, in turn, contains one datum or more. Each query in the STREAM data stream Management System therefore, has the form Select [Relation-to-Stream Operator] [Stream-to-Relation Operator][Relation-to-Relation Operator]

As in the example:

Select IStream(*) From S1 [Rows [000], S2 [Range 2 Minutes] Where S1.A=S2.A And S1.A>10

While the STREAM data stream Management System does offer general purpose data stream manipulation, the approach incorporates an overly complex object model. STREAM's CQL is overly complex because it requires one to think about the three operator types in order to construct a query. Operators are not applied to pure data streams causing one's development of queries to be overly difficult due to overly sophisticated conceptualization. The support of three Relation-to-Stream operators provides rich functionality but the practical use of the DStream and RStream operators is limited.

The Stanford research does not address how to integrate publish-subscribe semantics in order to support publishers of data streams and subscribers to data streams. Publish-subscribe semantics is an important information flow paradigm to support for continuously updating data sources and targets in enterprise real-time information processing systems.

A drawback of the lack of a general-purpose and organized approach for processing multiple data streams continuously is the development cost for each multiple data stream processor. Each time a new set of behavior and goals is required to be implemented, a new continuous processor must be constructed. These distinct continuous processors tend to perform much of the same core processing comprising receiving data, filtering data, joining data, transforming data, detecting data, and computing derived data. However, the code developed for each continuous processor is different, requires time and resources to design and develop, and time and resources to assure quality as well. Software development, maintenance, and enhancement costs are high and unnecessary when compared to a general-purpose continuous processor that can be reused across different continuous processors. Furthermore, many continuous processing systems merge and process data in ways that can be shown to be equivalent to query-like manipulations. While the Stanford STREAM system provides general purpose processing, it maintains an overly complex object model and lacks support for the key publish-subscribe paradigm. This will result in software development and engineering costs that are not as low as they could be.

Since the Celequest Streaming DataFlow Engine is based on Stanford's STREAM system, it maintains the same software engineering cost issues. Celequest's system appears to treat all streamed data as events and states that it employs XML data between its internal subsystems. While XML maintains known software engineering advantages, its use for core processing in high performance systems is generally discouraged.

In light of the above, there is a need for methods and apparatus for a general-purpose continuous query processor with simplified object model and support for publish-subscribe data stream sources and targets.

SUMMARY OF THE INVENTION

The present invention enables query processors that receive data continuously from one or more publishers of data streams in order to push query results as data streams to one or more subscribers continuously. In particular, the present invention recognizes that query processing is best performed on data represented in any structured form, which may be as simple as the rows adhering to a table schema found in a SQL-based relational database, or may be as complex as the hierarchically structured elements adhering to an XML Schema found in XML. As a result, the present invention processes data utilizing any form where each datum is a structured element with typed name-value pairs. Meanwhile, the query processors continuously view data streams as producing structured elements comprising the typed name-value pairs so that they can maintain the real-time result of a relational query expression on one or more distinctly structured data streams as soon as publishers provide new structured elements of data. The multiple publishers may each generate distinctly structured and typed data and may each generate such data at distinct constant or variable rates. The software processor is embodied as a Continuous Query Processor and associated subsystems and files associated therewith.

DETAILED DESCRIPTION

Figure 1:
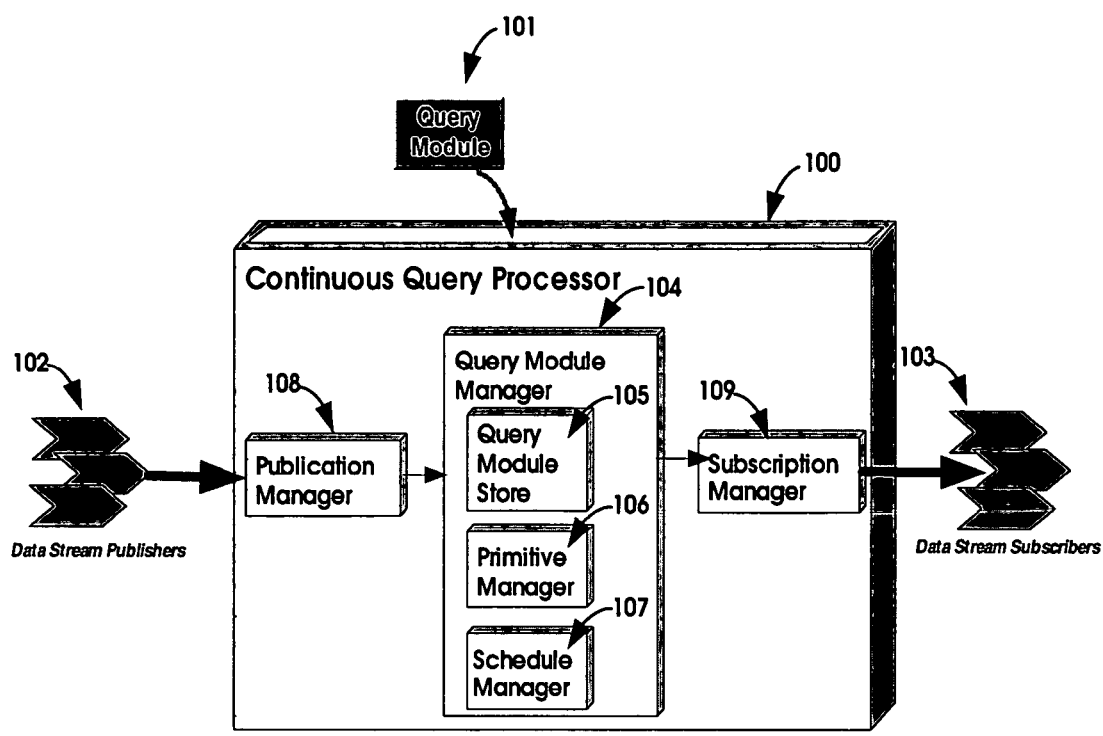
FIG. 1 illustrates the Continuous Query Processor, Publishers and Subscribers, and internal subsystems.
Figure 2:
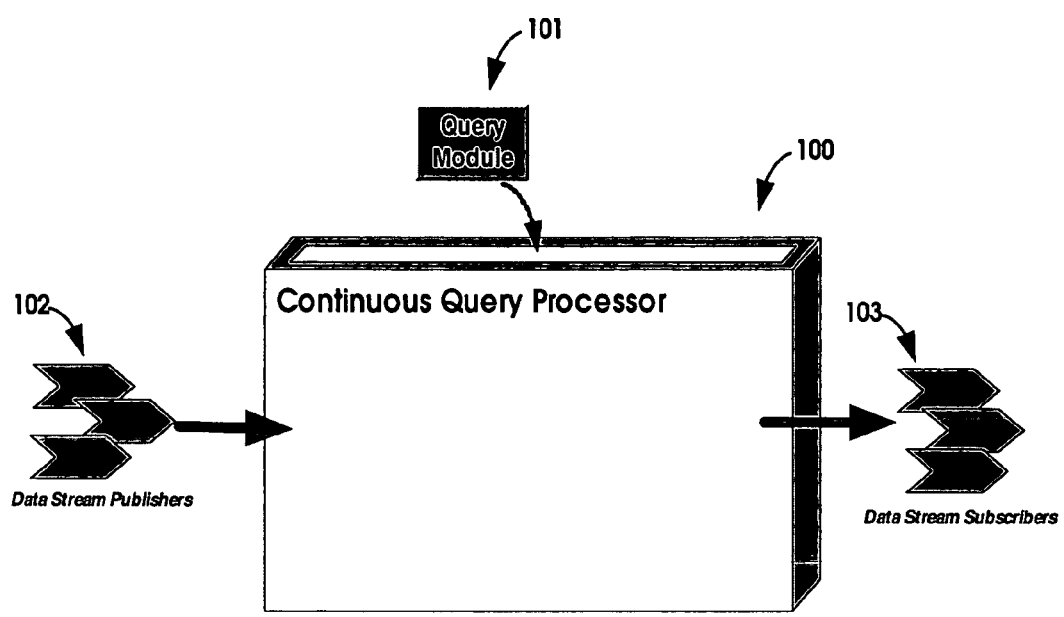
FIG. 2 shows the Continuous Query Processor, a Query Module being deployed, and external data stream Publishers and Subscribers.

In accordance with one embodiment of the present invention is a Continuous Query Processor 100 in FIG. 1, with salient subsystems depicted. This Continuous Query Processor 100 gives dynamics to and processes continuous queries defined and deployed as a Query Module 101. Once a Query Module 101 is deployed, data stream Publishers 102 can publish structured elements of data to the input slots of the deployed Query Module 101. The Query Module 101 produces structured elements on its outputs slots which data stream Subscribers 103 receive. FIG. 2 distills the Continuous Query Processor 100, Query Module 101, Publishers 102 and Subscribers 103 in a single diagram to illustrate these simple key relationships.

The rest of FIG. 1 illustrates the internal subsystems of the present invention, a Continuous Query Processor 100 including: a Publication Manager 108 for accepting published structured elements of data from one or more data stream Publishers 102, a Subscription Manager 109 for giving structured elements of data to one or more data stream Subscribers 103, a Query Module Manager 104 for processing queries represented by Query Modules, a Query Module Store 105 for maintaining each of the deployed Query Modules 101 by name, a Query Primitive Manager 106 within the Query Module Manager 104 for performing the processing for various primitives that comprise a Query Module 101, and a Schedule Manager 107 for coordinating when each individual primitive within a Query Module 101 gets processed.

The following detailed description of embodiments of the present invention employs the diagrams in FIG. 1 through FIG. 9. Embodiments of the present invention will implement the benefits of continuous query processing with a software programming language. Any programming language may be employed, but one of the object oriented programming languages are preferred due to their tendency to naturally organize the code correctly when used by those persons skilled in the art of object oriented software engineering.

One embodiment of the present invention uses an object oriented language to represent each of the salient objects with an instance of a class. Throughout the discussion, each of the objects is assumed to be an instance of a class and at various points in the description, methods are identified with a left and right parenthesis as in "methodName( )". In some cases, the arguments to methods are also identified with their names inside the parenthesis comma separated.

With reference to FIG. 2, a Continuous Query Processor 100, fabricated in accordance with the present invention provides methods and apparatus for one or more Query Modules 101 to be deployed into it. These Query Modules 101 are preferably deployed prior to structured element publication by data stream Publishers 102 and before data stream Subscribers 103 will receive structured element subscriptions.

Embodiments of the present invention enable Query Modules 101 to process queries continuously upon one or more simultaneous data stream Publishers 102 in order to produce an output data stream to Subscribers 103. In accordance with one embodiment of the present invention, the advantageously obtained ability is realized by Query Modules 101 constructed as assemblies of connected primitive operators which will be described in a moment. As the Publication Manager 108 receives published structured elements of data, it sends each structured element to the publication's designated input slot on a Query Module 101. The Query Module 101 processes the input structured elements according to its internal primitive operator assembly and produces structured elements to the Query Module's 101 output slots. The Subscription Manager 109 receives the structured elements from these output slots so that any Subscribers 103 will then receive the output structured element data that they subscribe to.

Figure 3:
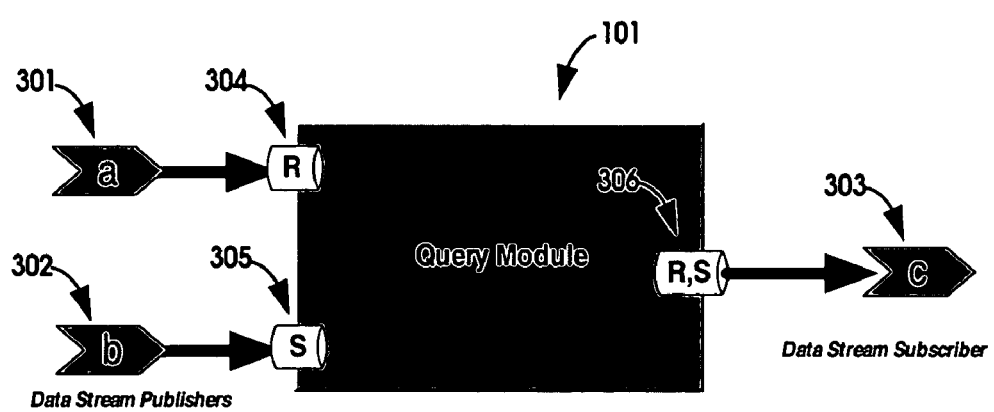
FIG. 3 illustrates a Query Module with two input slots and one output slot logically connected to two data stream Publishers and one data stream Subscriber.
Figure 4:
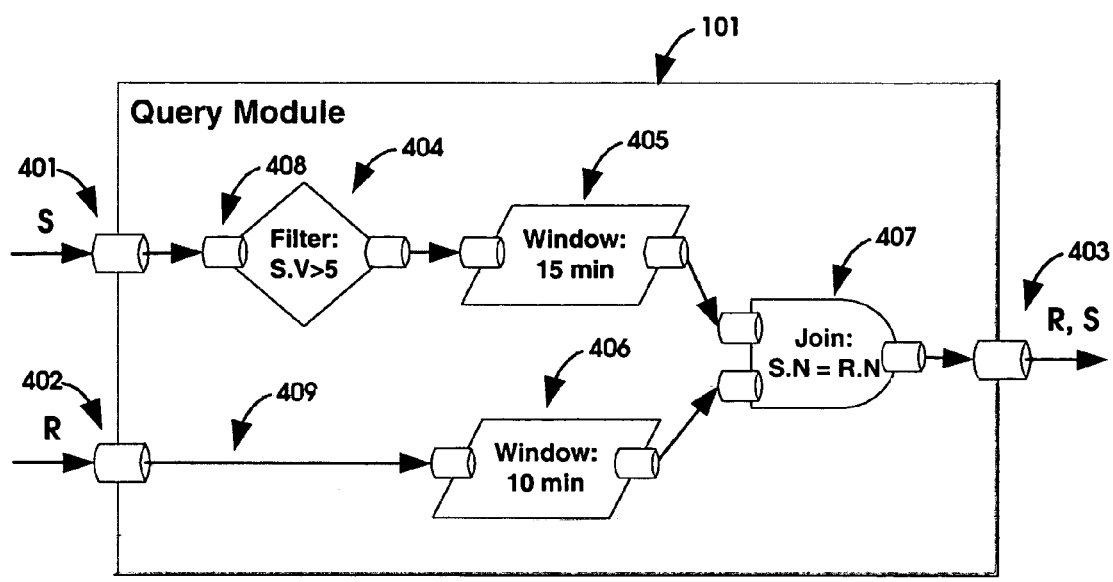
FIG. 4 depicts an example Query Module with internal primitive operators connected in a simple network with input and output slots illustrated.

FIG. 3 and FIG. 4 detail the interfaces and internal operations of a Query Module 101. FIG. 3 depicts the input and output slots that interface with either the Publication Manager 108, Subscription Manager 109, or other Query Modules 101. A Query Module 101 is illustrated logically with its "R" and "S" labeled input slots (304 and 305) and one "R,S" labeled output slot 306 connected to data streams. Specific data stream Publishers with names "a" and "b" (301 and 302) are shown publishing to the two input slots (304 and 305). data stream "a" 301 may publish structured elements with a totally distinct structure than the structured elements published by data stream "b" 302 and the rate that information is published from data stream "a" 301 to input slot "R" 304 versus data stream "b" 302 to input slot "S" 305 may be distinct. Nevertheless, Query Module 101 continuously updates its output slot "R,S" 306 for subscribing data stream "c" 303 whenever a structured element arrives to one or both of its input slots (304 and 305) regardless of when one or the other input slot (304 and 305) receives a structured element datum and regardless of the rate of the arrival of data to either input slot (304 and 305).

One embodiment incorporates a Query Module Manager 104 which accepts the deployed Query Modules 101 and stores them in a Query Module Store 105 for look up later. The Query Module Store 105 stores each of the Query Modules 101 by their name so they can be found easily when looking for them upon structured element publication arrival. When a Query Module 101 is deployed, its textual description of connected primitive operators is read and actual object representations of the input and output slots, the connections, and the primitive operators, are all constructed in memory, in order to facilitate fast processing as structured element publications arrive.

Preferably, embodiments will deploy an example Query Module 101 as pictured in FIG. 4 with the objects in memory representing primitive modules as well as input and output slots, and directional connections.

In this Query Module 101 of FIG. 4 example, the query represented by this Query Module 101 is SELECT * FROM R(10 min), S(15 min) WHERE S.V>5 AND S.N=R.N.

Those skilled in the art will recognize that many continuous query language definitions and associated compilers may be developed to produce a Query Module 101. As such, embodiments can implement their own methods and apparatus for compiling queries such as this one into the objects described so they can be put into memory. Query Modules 101 can, therefore, represent complex relations as well as complex joins, sub-selects, and other operations, but the query represented will be managed continuously across distinctly structured data streams with distinct rates of published information.

One embodiment of the present invention maintains a Primitive Manager 106 that stores all of the actual implementations of primitive operations available in the continuous query language and provides objects representing specific instances of a primitive operation when necessary for deployment. The objects are provided in the form of a Primitive Module with input slots and output slots.

One embodiment of the present invention maintains a Primitive Manager 106 that allows new primitive modules to be added. However, the language compiler used after the deployment of new primitive modules may not recognize the new primitive operation represented by the new module. Thus, a new language compiler may be required when with the deployment of new primitive modules.

For example, one embodiment of the present invention provides a Filter Primitive with one input slot and one output slot. When a query statement has an expression representing a filter, the compiler gets a Primitive Module representation of a Filter operation and sets the filter expression to the Filter Module.

One embodiment of the present invention recognizes that the deployment of Query Module 101 objects is in preparation for the way that the Schedule Manager 107 expects to operate. When the objects for the primitive modules (404 through 407), the external input and output slots (401 through 403), the internal input and output slots 408, and the internal connectors 409 are constructed and placed in memory, they are associated with a directed dependency tree. The dependency tree places each of the external output slots 403 at the root of the tree and then places each of the immediate primitive modules 407 that the external output slot 403 depends on as immediate children in the dependency tree. The modules (405 and 406) that this child primitive module depends on for inputs are then placed as children to the primitive module in the dependency tree and so on until the whole dependency tree is constructed. In the example of FIG. 4, the topology of the dependency tree is identical to the structure depicted. In the described embodiment, there is one dependency tree root for each external output slot 403. Each dependency tree is then used by the Schedule Manager 107 to perform each of the primitive modules in a proper sequence that is presented later.

Figure 5:
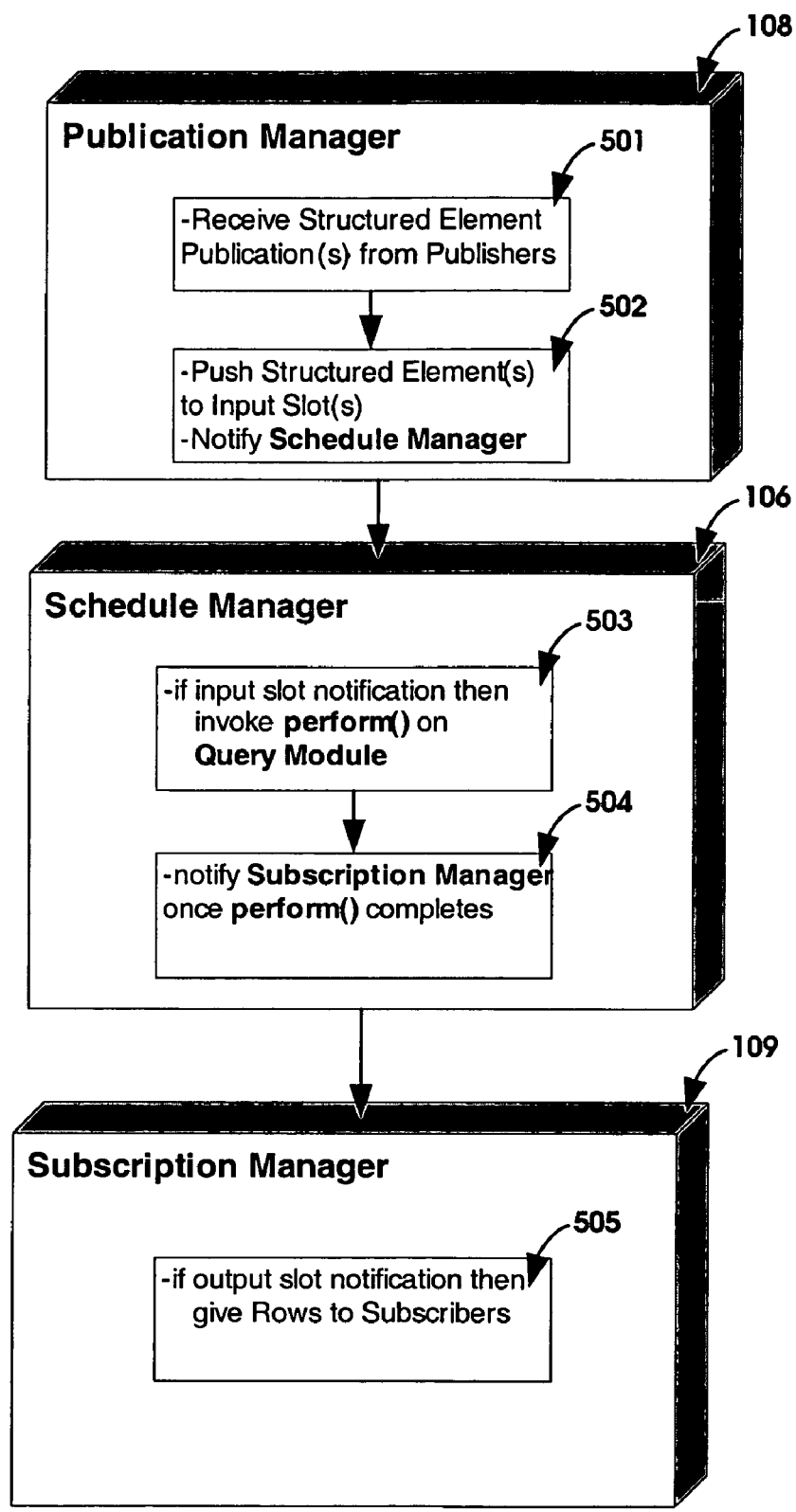
FIG. 5 depicts the distinct Publication Manager, Schedule Manager, and Subscription Manager processes and the lifecycle of a published structured element through the activities of each of these Managers.

With reference to FIG. 5, one embodiment of the present invention employs three distinct processes for the Publication Manager 108, Schedule Manager 107, and Subscription Manager 109 to perform publish and subscribe capable continuous query processing. Specifically, the lifecycle of receiving a structured element of data from publishers 501, processing it via a Query Module's 101 perform( ) method 503, and then giving 505 the processed output to subscribers is illustrated. As depicted in FIG. 5, the Publication Manager 108 notifies the Schedule Manager 107 process when a published structured element arrives to an input slot 502. The Schedule Manager 107 notifies the Subscription Manager 109 process when a Query Module 101 is done processing 504. Finally, the Subscription Manager 109 gives the processed output structured element or structured elements to subscribers 505. This lifecycle is described in more detail below.

Typical embodiments provide a Publication Manager 108 that receives publications containing structured elements sent to the full path name of a Query Module input slot as its publication topic. The full path name in one embodiment is:

<Query Module Name>/<input slot Name>.

Other embodiments of the present invention provide a Publication Manager 108 that allows publishing of a partial structured element corresponding to a subset of names of the expected input slot schema of an input slot. In this case, the non-published names are assumed to have the values of the previous input structured element.

Other embodiments of the present invention provide a Subscription Manager 109 that allows subscribing to a subset of names to the expected output slot schema of an output slot. In this case, the subscriber receives partial output structured elements which are each a subset of the normal output structured element expected.

Those skilled in the art of remote computer communication protocols will recognize that there are many standard techniques for Publishers 102 to employ for publishing structured elements of data to embodiments of the present invention. This is also true for Subscribers 103. Various approaches include CORBA, Java RMI, HTTP, and Java Messaging Service.

Figure 6:
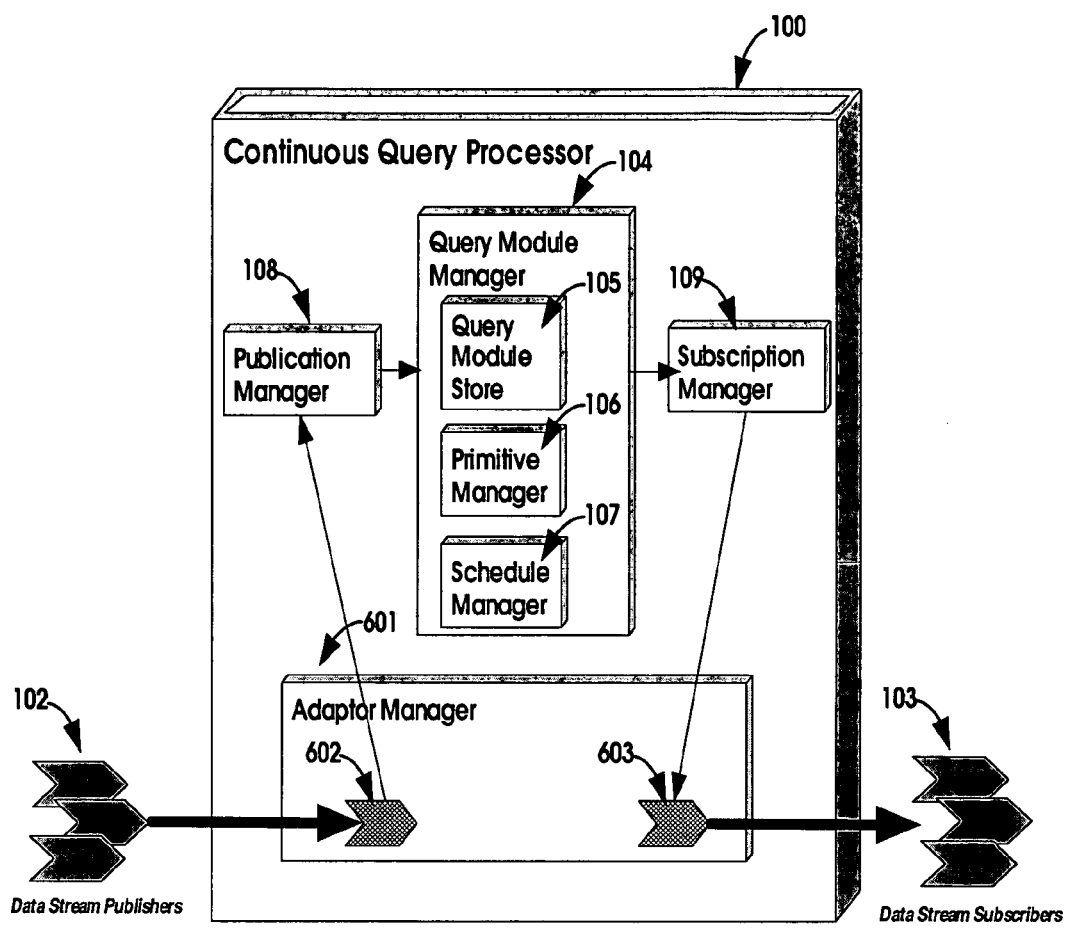
FIG. 6 again depicts the Continuous Query Processor, Publishers and Subscribers, and internal subsystems, but with an Adaptor Manager added.
Figure 7:
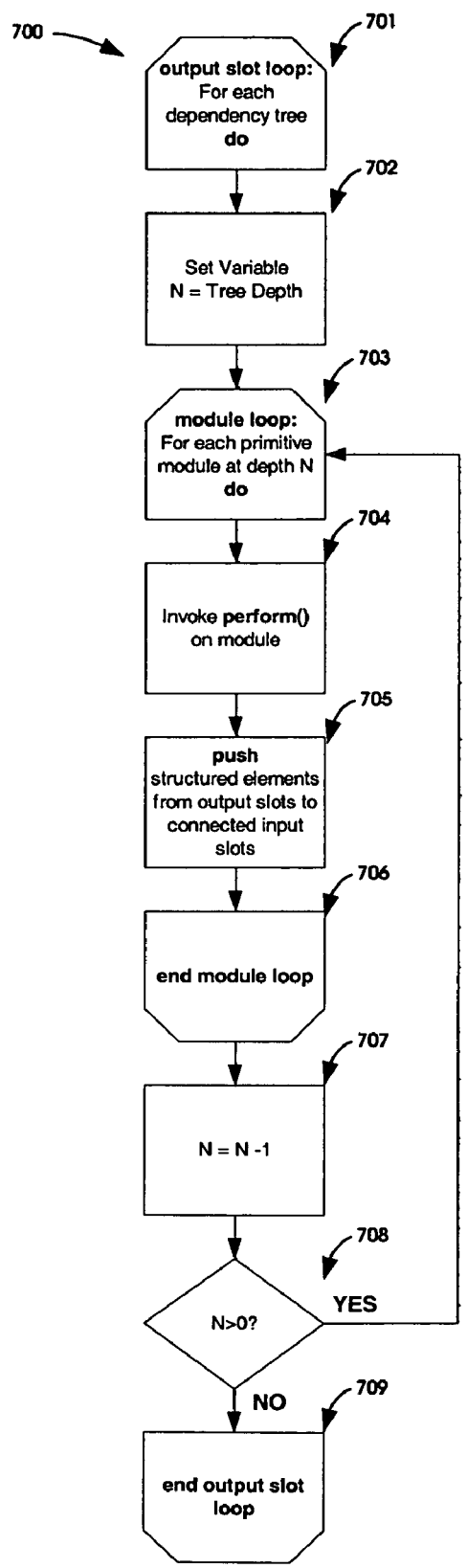
FIG. 7 depicts a flow chart of the sequence of operations in processing a Query Module's internal primitive module networks.

One embodiment of the present invention provides an Adaptor Manager 601, as shown in FIG. 6, that provides APIs for different remote protocols so that Publishers 102 can publish using any one of a number of distinctly different communication protocols. A Publisher Adaptor 602 may then easily be developed that provides communication using the selected specific remote protocol APIs.

One embodiment of the present invention has an Adaptor Manager 601 that provides Publishers 102 an HTTP API to publish to input slots. Publishers 102 can publish to a specific input slot at any time by using a POST request and the path "publishTo&slot" with the body of the POST message comprising the names and associated values.

In another embodiment of the present invention, an Adaptor Manager 601 establishes a descriptor for publications so that Publishers 102 do not need to include names in the POST message, thereby reducing bandwidth consumption. Those skilled in the art will recognize this and other standard approaches for optimized publication communication.

One embodiment of the present invention recognizes that each distinct Publisher 102 may naturally publish not only via a distinct remote protocol but may also employ a distinct format and representation of a structured element that may be proprietary or different than the format and representation expected by the Publication Manager 108. Such embodiments implement the Adaptor Manager 601 so that a specific Publisher Adaptor 602, built and deployed within the Adaptor Manager 601, may be configured and selected for communication with specific data stream Publisher 102 sources. While the Publisher Adaptor 602 provides the specific remote communications protocol that the Publisher 102 uses, each Publisher Adaptor 602 also transforms the native publication format and representation to the internal format and representation established and employed for processing by the internal subsystems of the embodiment. For example, one embodiment establishes the internal format of a structured element as the byte array 801 represented in the illustration in FIG. 8. The Adaptor Manager 601 provides APIs that facilitate construction of the internal format from the source native format. Those skilled in the art will find implementing the adaptation from a distinct data format and representation to the internal representation while also converting the remote protocol, if necessary, straightforward. This allows continuous query processing with queries comprising multiple simultaneous data stream Publisher 102 inputs even when they comprise distinctly different formats and representations of published structured elements while also using distinct remote protocols.

One embodiment of the present invention employs an internal structured element data format that more efficiently provides the registration of a structured element descriptor denoting the order of the name-value pairs expected after which a Publisher 102 may publish structured elements with only the values in the correct order. Such embodiments can employ a representation such as the one illustrated in FIG. 9.

In the case of publishing structured elements, one embodiment of the present invention allows the input slot to be easily found once the named Query Module 101 is looked up from the Query Module Store 105. For example, this is performed through an API call to getInputSlot(aName) on the Query Module 101 object. When the input slot is found, a received published structured element is input to its designated input slot via an API call to putElement(anElement) on the Input Slot 401 object.

One embodiment of the present invention employs a Schedule Manager 107 that wakes up periodically and checks to see if there is a new structured element notification. If there is not, the Schedule Manager 107 goes back to sleep unless some of the primitive operators are time dependent. If there is a new structured element notification, then the Schedule Manager processes the Query Module 101 or Query Modules with input slots that have received new structured elements of data.

One embodiment of the present invention recognizes a perform( ) method on every Query Module 101 and every Primitive Module (404 through 407). When the perform( ) method is invoked on any one of these modules, the operation that the module represents is executed on the input structured elements and an output structured element is produced.

One embodiment of the present invention provides a getElement( ) method on input slots which the perform( ) method implementation of a Query Module 101 or Primitive Module (404 through 407) uses to get the input structured element at each of its input slots.

As mentioned, in one embodiment, the primitive modules (403 to 407) are arranged in a dependency tree upon deployment. This assists the Schedule Manager 107 in the determination of the sequence of invoking perform( ) on the primitive modules (403 to 407) in the dependency tree for a specific Query Module 101. The processing plan is based on the fact that all dependent modules should be computed after the modules that they are dependent on. Thus, all leafs of a dependency tree are processed first after which their parents are processed and then the parents "parents" and so on until the root has a final answer.

In one embodiment of the present invention, the perform( ) method implementation of a Query module 101 stores the depth N of each dependency tree. There is one dependency tree for each output slot of a deployed Query Module 101. The runtime perform( ) method processing of the Query Module 101 is depicted as the flowchart of FIG. 7. Processing takes place in an outer loop (701 to 709) one dependency tree at a time. Processing for a single dependency tree begins by setting the variable N with the stored depth of the tree 702. A second inner loop (703 to 706) then processes all modules in the dependency tree at depth N one at a time. The initial per module step invokes the perform( ) method on the module 704. This results in output structured elements at the processed module's output slots. The implementation then invokes push( ) for each connection associated with these output slots 705. As part of this step, references to these output structured elements are put into the input slots of modules at the next lowest depth in the dependency tree. Once all of the modules at a depth N are processed 706, the depth variable N is decremented 707 to the next lower depth. As long as the depth N being processed is still positive, the next lower depth must be processed so that the control of flow resumes at step 703. This continues until the modules at depth 1 have been processed. Note that on the last push 710 at depth 1, the implementation is actually pushing structured elements references to the external output slots 403 of the Query Module 101. These appear as connected input slots to the modules at depth 1, but are actually the external outputs slots 403 of the encompassing Query Module 101. The Query Module's perform( ) method completes once N=0 (708) for the processing of the last dependency tree so that the outer loop terminates 709.

Preferably, embodiments will provide a Subscription Manager 109 that gives structured elements of processed output data to subscribers of specific output slot path names. The path name form is the same as that of the form for input slots.

In one embodiment of the present invention, an Adaptor Manager 601, as shown in FIG. 6 provides APIs for different remote protocols so that Subscribers 103 can subscribe using any one of a number of distinctly different communication protocols. A Subscriber Adaptor 603 may then easily be developed that provides communication using the selected specific remote protocol APIs.

In one embodiment of the present invention, an Adaptor Manager 601 provides Subscribers 103 an HTTP API to subscribe to output slots. Subscribers 103 can subscribe to a specific output slot by using a GET request and the path "subscribeTo&slot=<output slot path name>". Subsequently, a continuous HTTP connection can remain open for the Subscriber 103 to receive structured elements of data.

In one embodiment of the present invention, an Adaptor Manager 601 provides an API enabling messages to be pushed to Subscribers 103 via SOAP messages so that an HTTP connection does not need to remain continuously open. Those skilled in the art will recognize this and other standard approaches for optimized subscription communication.

In various embodiments, either asynchronous pushing of the structured elements to subscribers or synchronous pulling of structured element data by subscribers or both approaches may be used. For asynchronous pushing to subscribers, subscribers can register a callback method with the Subscription Manager 109 which may be called to submit the structured element data to the subscribers. In large distributed installations, this will not scale well, so a technique familiar to those skilled in the art may have to be considered. For example, embodiments can choose to incorporate the standard Java Messaging Service in order to support standard publish and subscribe protocols.

Figure 8:
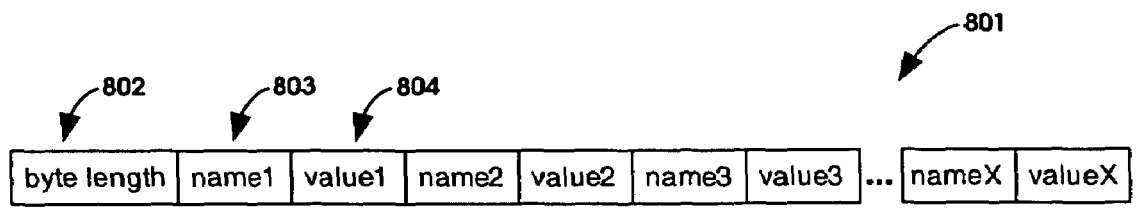
FIG. 8 illustrates the internal data format and representation of a structured element.
Figure 9:
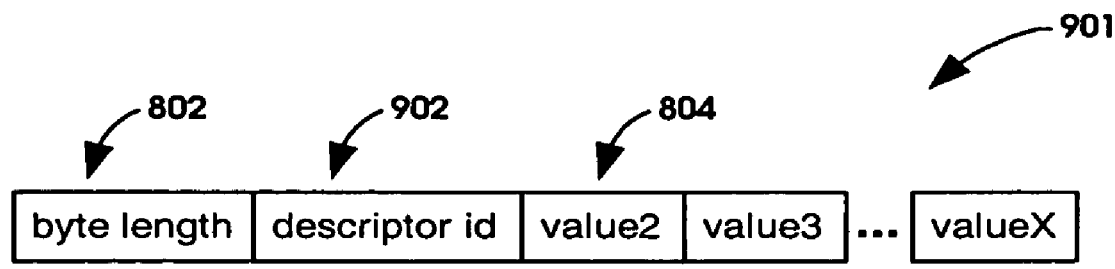
FIG. 9 illustrates the internal data format and representation of a structured element that refers to a descriptor to denote its structure.

In one embodiment of the present invention, each distinct Subscriber 103 may only be able to receive subscriptions via not only a distinct remote protocol but might also use a distinct format and representation of a structured element that may be proprietary or different than the format and representation that the Subscription Manager 109 generates. Such embodiments implement the Adaptor Manager 601 so that a specific Subscriber Adaptor 603, built and deployed within the Adaptor Manager 601, may be configured and selected for communication with specific data stream Subscriber 103 destinations. While the Subscriber Adaptor 603 must provide the specific remote communications protocol that the Subscriber 103 uses, each Subscriber Adaptor 603 must also transform the internal format and representation established and employed for processing by the internal subsystems of the embodiment to the native format and representation of the Subscriber 103. Again, the internal format of a structured element depicted as 801 in FIG. 8 is provided by one embodiment. The Adaptor Manager 601 provides APIs that facilitate retrieval of the necessary names and values from the internal format necessary to construct the adapted to destination format. Those skilled in the art of remote protocols and data format and representation transformation will find implementing the adaptation from an internal representation to a different representation while also converting the remote protocol, if necessary, straightforward. This allows Subscribers 103 to receive structured elements to be output in whatever distinctly different format and representation it expects while also using a distinct remote protocol.

In one embodiment of the present invention, an internal structured element data format more efficiently provides the registration of a structured element descriptor denoting the order of the name-value pairs expected after which a Subscriber 103 may receive structured elements with only the values in the correct order. As with Publishers 102, such embodiments can employ a representation such as the one illustrated in FIG. 9.

One embodiment of the present invention provides a Relational Connection Manager that provides the means for a static relational table or view to connect to an input slot. This is useful when the primitive module connected to processes a query. In this case, the query is meant to be applied to the table or view for each incoming structured element to input slots belonging to the same query. Since input slots connected to a table or view will not receive published structured elements, the Relational Connection Manager provides a mechanism for primitive modules to submit queries through the input slot made available via a getQuery( ) method on an input slot. This method merely returns the structured elements satisfying a given input query string.

One embodiment of the present invention provides a Relational Connection Manager that provides the means for a static relational table to connect to an output slot. In this case, output structured elements are inserted into the table as they are produced.

One embodiment of the present invention employs some primitive operations that are time sensitive in that they can produce new structured element outputs whether or not there are new structured element inputs. Primitive modules requiring this capability preferably implement the Boolean isTimeDependent( ) method by answering "True". When each Primitive Module is initially deployed, time dependent modules have the method getNextPerformTime( ) invoked on them. The Schedule Manager 107 stores the time for each Primitive Module and keeps them sorted by earliest time first wherein each time is associated with their Primitive Modules. The Schedule Manager 107 will wake up at the earliest time on the sorted list. Whenever the Schedule Manager 107 wakes up, it invokes perform( ) on each of the Primitive Module objects, as it does normally, according to the dependency tree algorithm described earlier. Once perform( ) processing completes, the Schedule Manager 107 must again invoke getNextPerformTime( ) on the Primitive Module requiring the wake up since time dependency may not be according to a set frequency. The new time provided is sorted and stored in the time list, again associated with the Primitive Module.

One embodiment of the present invention provides a Transformer Primitive Module that has one input slot and multiple output slots with a set expression for each output slot. As each input structured element arrives to the input slot, each transformer output expression is computed, simultaneously producing an output structured element for each output slot based on each computed expression.

One embodiment of the present invention provides a Generator Primitive Module that has no input slot and one output slot with a set output expression where the expression is computed based on an integer that increases on a set frequency. The Generator Primitive Module generates a structured element to its output slot at the set frequency.

One embodiment of the present invention extends the Generator Primitive Module with a set table or view name and an ORDER BY clause. The Generator primitive in this case produces an output structured element corresponding to each row in the table or view produced in the order established by the ORDER BY clause. Embodiments choose how to handle how to continue after the end of the ordered list of rows is reached. For example, the Generator may just end, repeat the output rows produced, or go backwards through the list. Another option is to produce the rows to the output slots randomly. Those skilled in the art may recognize other useful production sequences.

One embodiment of the present invention provides a Window Primitive Module that maintains some unusual behavior. The Window operation specifies that recently received structured elements of data should be kept for processing. The structured elements to keep are either based on a specified recent time window or a specified quantity of recently received structured elements. In the time window case, the Window Primitive Module's getNextPerformTime( ) should be updated to answer the time that the earliest structured element being kept arrived plus the time window amount. Whenever a new structured element is added to the Window list or removed, the output slot must be updated. The output slot comprises a reference, not to a single structured element, but the whole list of kept structured elements.

Embodiment of the present invention providing a Window Primitive Module should extend the protocol on input slots to include a getElements( ) method so that the list of structured elements coming from a Window Primitive may all be retrieved and processed by downstream modules.

One embodiment of the present invention provides a Join Primitive Module that has two or more input slots and one output slot wherein a set expression applied to all input slots is used such that when the expression evaluates to true, each of the input structured elements are combined into a single output structured element. The input slots may contain lists of structured elements. The Join expression will check every structured element in the input slot list against all combinations of structured elements in all other input slot lists. Those skilled in the art may use any of the well-known techniques to determine the output structured elements for this primitive module efficiently. For example, one embodiment of the present invention recognizes specific components of Join expressions as independent criteria for a specific input slot so that incoming structured elements not satisfying the independent expression criteria may be immediately dropped allowing for better efficiency on the overall Join computation.

One embodiment of the present invention provides an Accumulator Primitive Module that has one input slot and one output slot, a set time interval or quantity of structured elements, a set column name, and a selected function such as Average, Minimum, Maximum, or Sum. This primitive then computes the selected function as each incoming structured element arrives. The output slot produces output structured elements with a single column comprising the computed selected function's current value.

In order to maintain real-time accumulation computation, the preferred embodiment of the present invention recognizes that the selected Accumulator function is only to be computed within a time interval or the quantity of structured elements selected, such that earlier structured elements that were included in computation may be subtracted from the current computation. To process this correctly, all incoming values of the selected column must be kept in an array. If a time interval is selected, each value in the array must also be associated with their time of arrival. For Sum computation, the values that are no longer in the interval must be subtracted form the current Sum. Average works similarly in that a current Sum must be maintained separately from the current Average computation. With Average, the Sum is maintained along with the number of structured elements in the array, which can change as time proceeds. Average provides an output structured element by dividing the current Sum by the number of structured elements. For Minimum and Maximum computations, the array of values and timestamps must be augmented by being sorted by value all the time. This way, when values drop off due to exiting the time or quantity interval, the current minimum is readily available at the beginning of the array while the maximum is readily available at the end of the array.

In one embodiment of the present invention, the time interval mode of the Accumulator Primitive makes it time dependent such that output structured elements must be produced even with no input structured elements arriving. At the point at which a value is no longer in the time interval, the value must be dropped from the current computation and an output structured element with the computed value produced. Those skilled in the art may recognize other approaches for computing accumulator functions over quantity or time based intervals.

In one embodiment of the present invention, a Synchronizer Primitive Module with one or more input slots and one output slot for each input slot is provided. The Synchronizer Primitive makes sure that after each output structured element is produced, subsequent output structured elements are guaranteed to have a later timestamp or sequence number. Increasing timestamps can be guaranteed by maintaining a simple policy of using the current clock value for timestamping. Increasing sequence numbers can be guaranteed by an incrementing variable that uses the clock for its initial value. Starting the sequence using the clock guarantees that the sequence increases even after the Accumulator Primitive shuts off and is then started again. Those skilled in the art may recognize other approaches for guaranteeing increasing timestamps or sequence numbers.

One embodiment of the present invention provides a Synchronizer Primitive Module with an advanced mode where not only are increasing timestamp and/or sequence numbers guaranteed on output structured elements, but it is also guaranteed that each time-stamped structured element arriving to an input slot and having a timestamp difference between every other incoming input slot structured element will appear at its associated output slot at a deviation of no more than the original timestamp difference plus or minus a set time delta. This is accomplished by also setting a delay time for which input structured elements are guaranteed to be produced to their corresponding output slot. Thus, the Synchronizer Primitive Module employed in this mode is time dependent.

One embodiment of the present invention implements the Synchronizer Primitive Module in the advanced mode by having each input structured element wait exactly the delay time minus the time delta for other incoming structured elements. However, when it is time for a structured element to be output, the difference in its timestamp and all other delayed input structured elements is computed and associated with all delayed structured elements.

One embodiment of the present invention has a Publication Manager 108 that assigns sequence numbers to published structured elements as they are received. While this may be useful for administrative purposes, certain embodiments may find that a more sophisticated implementation of the Schedule Manager 107 supporting specific ordering criteria may require this sequencing.

One embodiment of the present invention has a Publication Manager 108 that assigns timestamps to published structured elements as they are received. This timestamp may be in addition to a timestamp already attached to the structured element by the source of the structured element data. These timestamps can be assumed to be present by specific time dependent Primitive Modules in order to facilitate their implementation. For example, the Window Primitive Module described earlier would have had to manage the time associated with each structured element received.

One embodiment of the present invention has a Subscription Manager 109 that assigns timestamps to structured elements output by Query Modules 101. Embodiments can elect either to replace previous timestamps or accumulate a history of timestamps for auditing or for use in various kinds of subsequent queries.

One embodiment of present invention provides Queues for Query Module 101 input slots so that a high rate of structured element publications will be kept and not lost when the Schedule Manager 107 is not able to keep up with the input rate. In this case, published structured elements will be consumed in the order they were received by the Schedule Manager 107 once it finishes the current query processing session. This will cause all structured elements that are next in line in all Query Module 101 input slots to be consumed at the same time.

One embodiment of the present invention provides a Workspace Manager that allows Query Modules to be deployed into distinct Workspaces so that they won't disturb Query Modules in other Workspaces. With this separate and distinct deployment capability, identical copies of the same Query Module with the same name may even be deployed to different Workspaces and operate simultaneously without disturbing each other.

It will be appreciated by those skilled in the art having the benefit of this disclosure that this invention is believed to present a basis for the creation of a publish and subscribe capable continuous query processor. Further modifications and alternative embodiments of various aspects of the invention will be apparent to those skilled in the art in view of this description. Such details as the exact definitions and specific code within the set of native methods as described herein are exemplary of a particular embodiment. It is intended that the following claims be interpreted to embrace all such modifications and changes and, accordingly, the specification and drawings are to be regarded in an illustrative rather than a restrictive sense.

What is claimed is:

1. A computer-implemented method of continuously processing a query module that receives data continuously from one or more publishers of data streams in order to push query results as data streams to one or more subscribers continuously, wherein the query module includes one or more input slots on which input data is received, one or more named output slots, and an assembly of connected primitive operators, the method comprising:

continuously receiving streaming input data from one or more external publishers, wherein the input data is received on the input slots of the query module;

performing primitive operations on the input data, wherein the primitive operators have data dependency relationship between each other and the primitive operations are performed in an order that is consistent with such data dependency relationship;

continuously generating output in real time on the output slots of the query module in response to receiving input data on the input slots, wherein the output is the result of performing primitive operations on the input data received on the input slots and the output is in the form of a data stream; and enabling external subscribers to subscribe to such data stream.

2. A computer-implemented method for providing continuous, real-time query results for a query module in a continuous query-processing system, wherein the query module, after compiled by a computer, is comprised of an assembly of connected primitive operators, the method comprising:

receiving a continuous stream of input data for the query module from one or more publishers of data streams;

processing the streaming input data on a continuous basis, wherein the streaming input data is processed by the assembly of connected primitive operators to generate output for the query module; and publishing output for the query module to an output data stream, wherein each time output is generated by the assembly of connected primitive operators from processing input data, such output is published in real-time to such output data stream to provide continuous, real-time query results for the query module, and wherein one or more sources external to the query module may subscribe to such output data stream to receive such real-time query results.

3. The method of claim 2, wherein the query module publishes output to a plurality of output data streams.

4. The method of claim 2, wherein the query module receives the input data from one or more publishers of data streams by subscribing to such data streams.

5. The method of claim 4, wherein the input data streams are external to the continuous query-processing system.

6. The method of claim 4, when wherein at least one input data stream is internal to the continuous-query processing system, but external to the query module.

7. The method of claim 4, wherein each input data stream publishes data at a location specified by a network address and the query module subscribes to such input data stream by receiving data from such location.

8. The method of claim 2, the streaming input data comes in rows of typed name-value pairs, and wherein the rows are processed incrementally by the assembly of connected primitive operators in sets of one or more rows.

9. The method of claim 8, wherein, in response to the assembly processing a set of rows, any output generated from processing such set is published to the output data stream in real time.

10. The method of claim 2, wherein the output data stream publishes data at a location specified by a network address.

11. The method of claim 2, wherein prior to the assembly of connected primitive operators processing the streaming input data, the streaming input data is synchronized to accommodate delayed rows and to re-order out of order rows.

12. The method of claim 2, wherein the query module may be dynamically deployed into the continuous query-processing system.

13. The method of claim 2, wherein the primitive operators correspond to source code expressions in the query module.

14. The method of claim 2, wherein the primitive operators have a data dependency relationship between each other, and the primitive operators execute in an order that is consistent with such data dependency.

15. The method of claim 14, wherein, in response to a primitive operator being selected for execution, the primitive operator fully processes all data then available on all input slots of the primitive.

16. A computer-readable storage medium having computer-executable instructions that when executed by a computer enables the computer to perform the following method:
- receiving a continuous stream of input data for a query module from one or more publishers of data streams;
- processing the streaming input data on a continuous basis, wherein the streaming input data is processed by an assembly of connected primitive operators to generate output for the query module; and
- publishing output for the query module to an output data stream, wherein each time output is generated by the assembly of connected primitive operators from processing input data, such output is published in real-time to such output data stream to provide continuous, real-time query results for the query module, and wherein one or more sources external to the query module may subscribe to such output data stream to receive such real-time query results.

17. The computer-readable storage medium of claim 16, wherein the query module publishes output to a plurality of output data streams.

18. The computer-readable storage medium of claim 16, wherein the query module receives the input data from one or more publishers of data streams by subscribing to such data streams.

19. The computer-readable storage medium of claim 18, wherein the input data streams are external to the continuous query-processing system.

20. The computer-readable storage medium of claim 18, wherein at least one input data stream is internal to the continuous-query processing system, but external to the query module.

21. The computer-readable storage medium of claim 18, wherein each input data stream publishes data at a location specified by a network address and the query module subscribes to such input data stream by receiving data from such location.

22. The computer-readable storage medium of claim 16, the streaming input data comes in rows of typed name-value pairs, and wherein the rows are processed incrementally by the assembly of connected primitive operators in sets of one or more rows.

23. The computer-readable storage medium of claim 22, wherein, in response to the assembly processing a set of rows, any output generated from processing such set is published to the output data stream in real time.

24. The computer-readable storage medium of claim 16, wherein the output data stream publishes data at a location specified by a network address.

25. The computer-readable storage medium of claim 16, wherein prior to the assembly of connected primitive operators processing the streaming input data, the streaming input data is synchronized to accommodate delayed rows and to re-order out of order rows.

26. The computer-readable storage medium of claim 16, wherein the query module may be dynamically deployed into the continuous query-processing system.

27. The computer-readable storage medium of claim 16, wherein the primitive operators correspond to source code expressions in the query module.

28. The computer-readable storage medium of claim 16, wherein the primitive operators have a data dependency relationship between each other, and the primitive operators execute in an order that is consistent with such data dependency relationship.

29. The computer-readable storage medium of claim 28, wherein, in response to a primitive operator being selected for execution, the primitive operator fully processes all data then available on all input slots of the primitive operator.

30. A computer-implemented method for continuously processing streaming input data for a query module in a continuous query-processing system, wherein the query module, after compiled, is comprised of an assembly of connected primitive operators, the method comprising:
- receiving rows of streaming input data for the query module from one or more publishers of data streams;
- sending the rows of streaming input data through the assembly of connected primitive operators, wherein the rows are sent though incrementally in sets of one or more rows, wherein the primitive operators operate on each such set as such set goes through the assembly, and wherein after a set of rows has been processed by the primitive operators, sending a next set of rows through the assembly to continuously process the streaming input data; and
- in response to the assembly of connected primitives generating output as a result of operating on a set of rows of input data, publishing in real time such output to one or more output data streams to continuously send available output to such output data streams.

* * * * *